United States Patent
Pullabhatla et al.

(10) Patent No.: US 11,917,723 B2
(45) Date of Patent: Feb. 27, 2024

(54) SYSTEM AND METHODS FOR TRANSMITTING PROTOCOL DATA UNITS

(71) Applicant: NXP USA, Inc., Austin, TX (US)

(72) Inventors: Vinod Sarma Pullabhatla, Hyderabad (IN); Mohammad Rawoof, Hyderabad (IN)

(73) Assignee: NXP USA, Inc., Austin, TX (US)

( * ) Notice: Subject to any disclaimer, the term of this patent is extended or adjusted under 35 U.S.C. 154(b) by 218 days.

(21) Appl. No.: 17/449,719

(22) Filed: Oct. 1, 2021

(65) Prior Publication Data

US 2022/0304110 A1 Sep. 22, 2022

(30) Foreign Application Priority Data

Mar. 17, 2021 (IN) .............................. 202111011399

(51) Int. Cl.
*H04W 56/00* (2009.01)
*H04W 80/02* (2009.01)
*H04W 72/0446* (2023.01)
*H04W 72/566* (2023.01)

(52) U.S. Cl.
CPC ....... *H04W 80/02* (2013.01); *H04W 72/0446* (2013.01); *H04W 72/569* (2023.01)

(58) Field of Classification Search
USPC ....................................................... 370/329
See application file for complete search history.

(56) References Cited

U.S. PATENT DOCUMENTS

| 8,964,784 | B2 | 2/2015 | Torsner et al. | |
| 2005/0111410 | A1* | 5/2005 | Bazar | H04W 4/24 370/331 |
| 2012/0230256 | A1 | 9/2012 | Torsner et al. | |
| 2014/0105227 | A1 | 4/2014 | Maheshwari et al. | |
| 2014/0376565 | A1* | 12/2014 | Kervik | H04L 47/39 370/412 |
| 2019/0149274 | A1* | 5/2019 | Freda | H04L 5/0091 370/329 |
| 2021/0360685 | A1* | 11/2021 | Huang | H04W 80/02 |
| 2023/0019547 | A1* | 1/2023 | Low | H04W 72/23 |

OTHER PUBLICATIONS

Diana Pani, Method and Apparatus for Enhanced Transport Format Combination Selection in Wireless Communications, Apr. 1, 2009, TW 200915761. (Year: 2009).*

* cited by examiner

*Primary Examiner* — Sai Ming Chan

(57) ABSTRACT

The disclosure relates to a system for transmitting Protocol data units (PDUs). Example embodiments include a system comprises a radio link control (RLC) layer for storing a RLC PDU list of RLC Protocol Data Units (PDUs) received from a ProtocolData Convergence Protocol (PDCP) layer. The control layer comprises a transmission block for transmission to a Media Access Layer (MAC) layer in a transmission event, wherein the transmission block is populated with a subset of PDUs in the RLC PDU list. When the transmission block is near a storage limit, the system scans the RLC PDU list for a PDU that best fits a remaining grant of the transmission block to complete population of the transmission block. The control layer further comprises a priority list for storing PDUs of the RLC PDU list scanned by the system that were greater in size than the remaining grant.

15 Claims, 4 Drawing Sheets

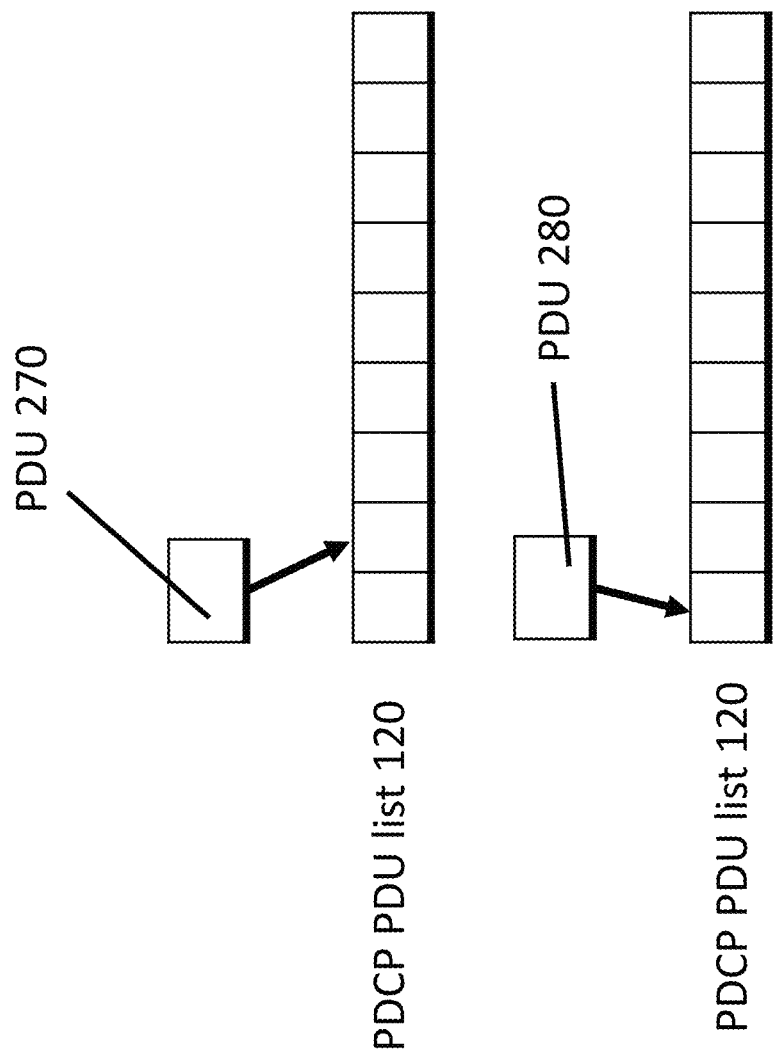

SYSTEM AND METHODS FOR TRANSMITTING PROTOCOL DATA UNITS

CROSS-REFERENCE TO RELATED APPLICATIONS

This application claims the priority under 35 U.S.C. § 119 of India application no. 202111011399, filed on 17 Mar. 2021, the contents of which are incorporated by reference herein.

FIELD

The disclosure relates to a system and methods for transmitting Protocol Data Units. In particular, to a system and methods for improved performance by reducing the overhead associated with the segmentation of Protocol Data Units PDUs.

BACKGROUND

Wireless communications systems are widely used in various forms of data transmission, such as voice, video and other types of communication content. An overall objective is to improve communication standards by providing better services, improving efficiency and provide better integration with other open standards. One way to improve the efficiency of data transmission is by addressing the issue of the overhead of segmentation and padding during a transmission of a Protocol Data Unit (PDU).

During data transmission, a Radio Link Control (RLC) layer is responsible for segmenting RLC Protocol Data Units (SDUs) that are received from a higher Packet Data Convergence Protocol (PDCP) layer. Segmentation of the PDUs in the RLC layer is required to enable the RLC PDUs to fit within the available grant of a transmission block. However, this increases the number of cycles required to transmit data during transmission, and degrades system performance. Additionally, duplicate bytes need to be removed during the reception of the PDUs, which further compromises system performance.

Existing solutions, for example, involve segmenting RLC PDUs based on a constraint while storing them in the RLC PDU queue, and determining whether to perform segmenting on a last PDU based on comparing a remaining portion of the transmission block to the constraint value. However, such methods do not depend on real time transmission opportunity and try to pre-determine whether segmentation is to be done or not before-hand, which may work only under very limited conditions. Other solutions employ adaptive segmentation in a higher protocol layer, where a threshold of a largest transmission block is defined at the higher layer. However, here the decision to segment the PDUs is not decided dynamically during a transmission opportunity.

SUMMARY

An aspect of the present invention defines a system according to claim 1. Further aspects of the present invention define methods according to claims 3 and 9. Optional or preferred features are described in the dependent claims.

In an embodiment there is provided a system for transmitting protocol Data Units (PDUs), said system may comprise: a radio link control (RLC) layer for storing a RLC PDU list of RLC protocol data units (PDUs) received from a Packet Data Convergence Protocol (PDCP) layer, said control layer comprising: a transmission block for transmission of said PDUs to a Media Access Layer (MAC) layer in a transmission event, wherein the transmission block is populated with a subset of PDUs in the RLC PDU list; wherein when the transmission block is near a storage limit, the system scans the PDU list for an PDU that best fits to a remaining grant to complete population of the transmission block; and a priority list for storing PDUs of the RLC PDU list scanned by the system that were greater in size than the remaining grant.

In can be appreciated that a PDU that best fits to a remaining grant (space available in a transmission block, typically in bytes) may be considered to be either: 1) A PDU with a size that matches exactly to the remaining grant, or 2) A PDU which has a size less than the remaining grant, but which would leave a negligible number of bytes remaining in the transmission block (the size of the bytes here is an implementation choice), which could be padded, or 3) Any PDU which fits the remaining grant and leaves significant bytes as a remainder in the transmission block. In this latter case, the scan may continue to iteratively repeat this process until the next best-fit for the remainder of the bytes in the transmission block is found.

In another embodiment, the RLC layer may further comprise a further transmission block populated with PDUs in the RLC PDU list, with priority given to PDUs stored within the priority list. The further transmission block may be transmitted to the MAC layer in a further transmission event.

In a further embodiment there is provided a method for enhancing system performance in 5G modes, said method may comprise: i) storing in a Radio Link Control (RLC) layer a RLC PDU list of protocol Data Units (PDUs); ii) scanning the RLC PDU list to locate a PDU that best fits to a remaining grant of a first transmission block if a size of an actual to-be-sent PDU in the RLC PDU list is greater than the remaining grant; and a) appending the best-fit PDU to the first transmission block, iii) appending the scanned PDUs to a priority list; and iv) transmitting the first transmission block to a first Media Access Control (MAC) layer.

In one embodiment, the method may further comprise the steps of: v) appending the PDUs in the priority list to a subsequent transmission block, wherein the subsequent transmission block is the next transmission block after the first transmission block is transmitted to the MAC layer; and vi) repeating steps ii) to v) until all the PDUs in the list are transmitted to the MAC layer. For subsequent transmission events the subsequent transmission block is therefore considered the first transmission block in relation to the method described above. It can be appreciated that the data contained within all transmission blocks (first and subsequent) may be different each time, because each transmission block is populated with different PDUs from the RLC PDU list after transmission of a previous transmission block. As noted above, data contained in subsequent transmission blocks may be taken first from the priority list if it is not empty and then from the RLC PDU list. If the priority list is empty then PDUs from the RLC PDU list are taken in accordance with the method described above.

In yet another embodiment, the step of scanning the RLC PDU list further comprises the steps of: b) segmenting the actual to-be-sent PDU in the RLC PDU list if no PDU that best fits the remaining grant is found, and appending a segment of the actual-to-be sent to the first transmission block.

In some embodiments, step ii) may be performed for a fixed number of PDUs in the RLC PDU list.

Another embodiment defines a method for enhancing system performance in 5G modes, said method may comprise: i) storing in a Radio Link Control (RLC) layer a RLC PDU list of Protocol Data Units (PDUs); ii) scanning the RLC PDU list to locate a PDU that best fits to a remaining grant of a first transmission block if the size of an actual to-be-sent PDU in the RLC PDU list is greater than the remaining grant; and iii) appending the best fit PDU to the first transmission block; and iv) transmitting the first transmission block to a Media Access Control (MAC) layer.

In some embodiments, step ii) may be performed for a fixed number of PDUs in the RLC PDU list.

In other embodiments, the method may further comprise appending the scanned PDUs to a priority list.

In one embodiment, the method further comprises appending the PDUs in the priority list to a subsequent transmission block, where the subsequent transmission block is the next transmission block after the transmission block is transmitted to the MAC layer.

In yet another embodiment, the step of scanning the RLC PDU list to locate a PDU that best fits to a remaining grant further comprises a step of segmenting the actual to-be-sent PDU in the RLC PDU list if no best-fit PDU is found, and appending a segment of the actual to-be-sent PDU to the first transmission block.

Steps ii) to iv) may be repeated until all the PDUs in the RLC PDU list are transmitted to the MAC layer.

In some embodiments, the size of each PDU in the RLC PDU list may be distinct.

In other embodiments, the size of the transmission block (in bytes) may be set by the MAC layer. Any number of PDUs can be present in the transmission block provided it doesn't exceed the grant size of the transmission block.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a computer readable medium, which may be a physical computer readable medium, such as a disc or a memory device, or may be embodied as a transient signal. Such a transient signal may be a network download, including an internet download.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which:

FIG. 4 illustrates a method for re-assembling Protocol Data Units.

DETAILED DESCRIPTION OF EMBODIMENTS

Disclosed herein in general terms is a method for improving system performance in 5G standalone (SA) and non-standalone (NSA) modes by reducing the number of core cycles spent during a transmission opportunity, as well as the number of cycles spent during reassembly by a receiving entity.

Figure 1:
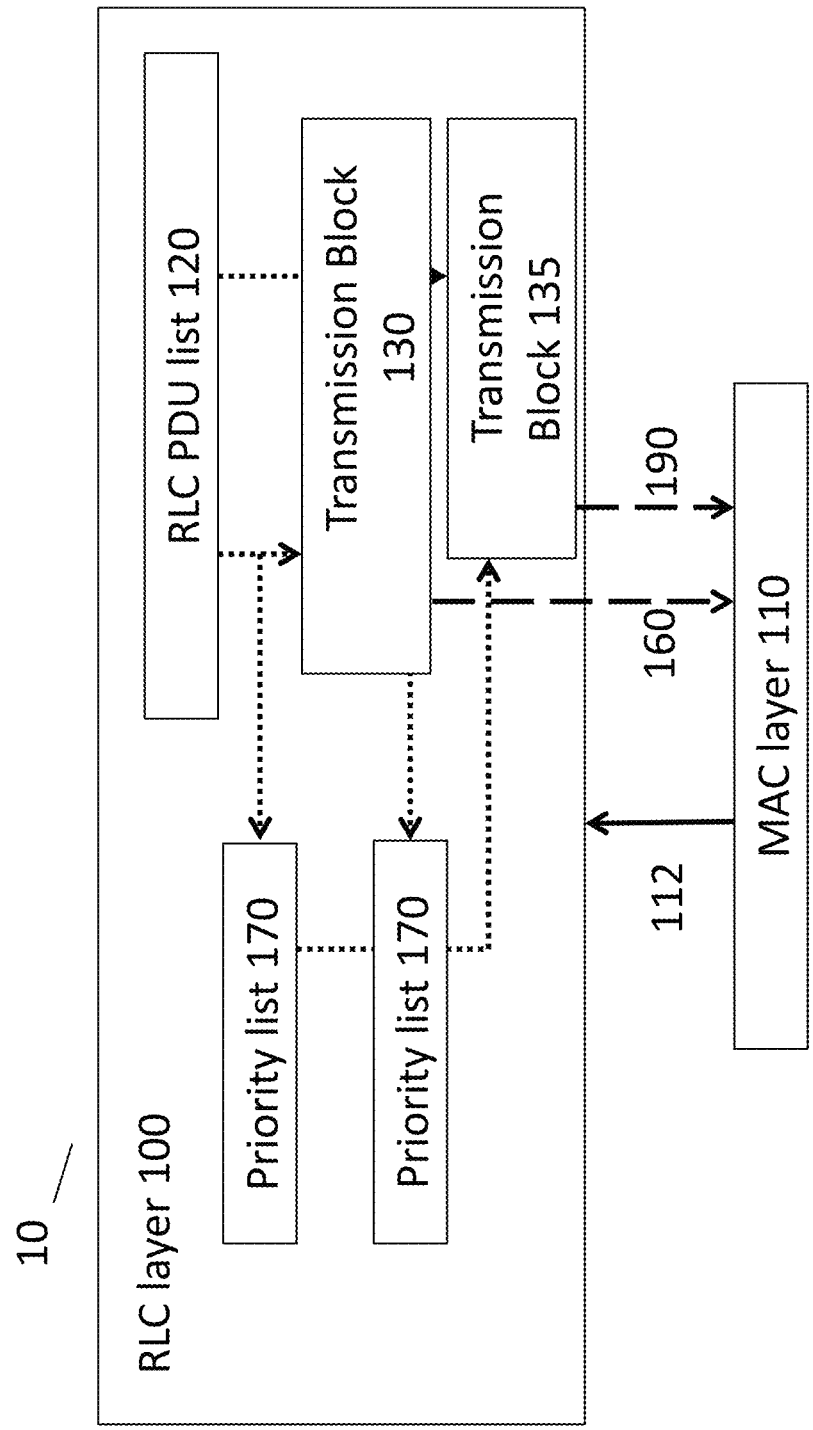
FIG. 1 illustrates an interaction between a RLC layer and a MAC layer.

FIG. 1 illustrates a communication system 10 of a base station according to an embodiment of the present invention. Within the system 10, FIG. 1 shows the interaction between a Radio link Control (RLC) layer 100, which may be user equipment (UE) such as a mobile phone or the like, and a lower Media Access Layer (MAC) 110. In examples, the RLC layer 100 stores a list 120 of Protocol Data Units (PDUs) which are received from a higher Protocol Data Convergence Protocol (PDCP) layer (not shown). The RLC layer 100 also adds header information to each of the PDCP PDUs.

In an exemplary embodiment, when the RLC layer 100 receives a transmission request 112 from the lower MAC layer 110. The request 112 contains information on the maximum number (in bytes) of the RLC PDUs 130 that can be sent to the MAC layer 110, and the time window within which the RLC PDUs must be sent.

Figure 2:
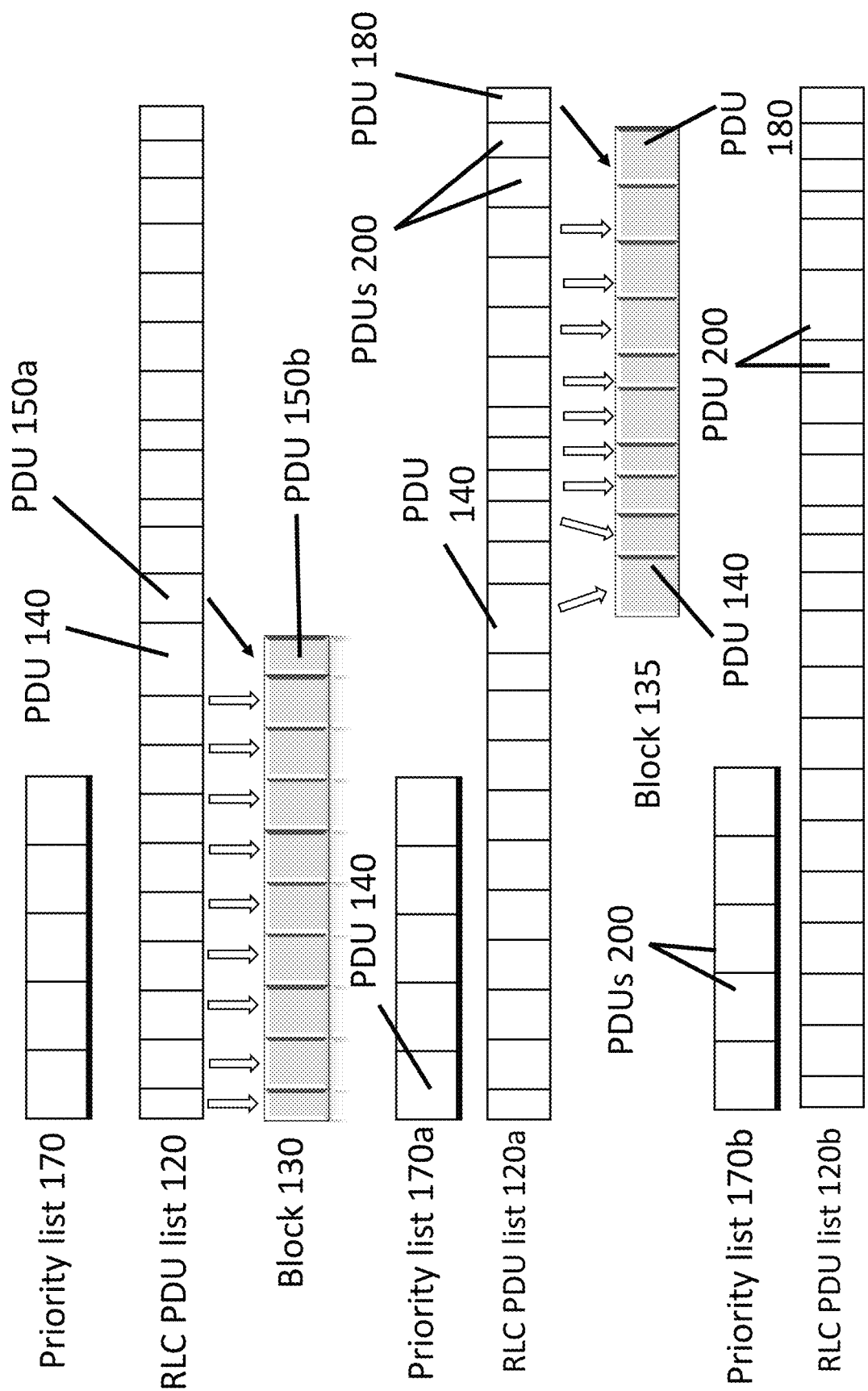
FIG. 2 illustrates a method of constructing transmission blocks within the RLC layer.

Subsequently, the RLC PDUs list 120 is scanned to construct a transmission block 130 comprising a plurality of RLC PDUs. The sizes of each of the individual PDUs in the list 120 are also different. Thus, when scanning the list 120 and constructing the block 130, if the RLC layer 100 encounters a PDU (for example, PDU 140 as shown in FIG. 2) in list 120 that is bigger than the grant (or space) available within the block 130, the RLC layer 110 performs a one-by-one scan of the list 120 for a maximum configured number of PDUs in the list 120. If during the scan a PDU (shown as 150a in FIG. 2) matching the available space in the block 130 is found, then it is appended to the block 130 (see SDU 150b), and the block 130 is submitted to the MAC layer 110 during a first transmission opportunity 160, as shown in FIG. 1. At the same time, all the scanned PDUs (e.g. SDU 140) in the list 120 that do not fit the available grant are stored in a higher priority list 170a.

During a subsequent request 112 from the MAC layer 110, the RLC layer 100 prioritises those PDUs (e.g. 140) stored in the higher priority list 170a to occupy a subsequent block 135. For example, as shown in FIG. 2, the RLC layer 100 initially appends the PDU 140 stored in the higher priority list 170a to the new block 135, and only then proceeds to append the PDUs from the list 120a to fill the remaining grant in the block 135. As with the previous block 130, if the next available PDU in the list 120a is found to be bigger than the remaining grant within the block 135, then RLC layer 100 performs a scan of the list 120a up to a configured maximum number of PDUs until a PDU 180 with a matching size (or the next best-fit PDU 180) is found. The number of PDUs to be scanned is an implementation choice, and can be up to the number of PDUs available in the RLC PDU list 120a.

A best-fit can be defined as either: 1) A PDU 180 with a size that matches exactly to the remaining grant, or 2) A PDU 180 which has a size less than remaining grant with a negligible number of bytes (the size of the bytes here is an implementation choice) remaining which could be padded, or 3) Any PDU which fits the remaining grant and leaves significant bytes as a remainder in the transmission block. In this latter case, the scan may continue until the next best-fit for the remainder of the bytes in the transmission block is found.

This PDU 180 is then appended to the block 135, and the block 135 sent to the MAC layer 110 during a second transmission opportunity 190. As before, all the scanned PDUs 200 in the list 120 which do not fit the available grant are stored a higher priority list 170b. These PDUs 200 will then take priority over remaining PDUs in the list 120b during construction and transmission of a subsequent transmission block (not shown). It can be appreciated that although shown as separate RLC PDU lists and priority lists in the figures this is for ease only.

Figure 3:
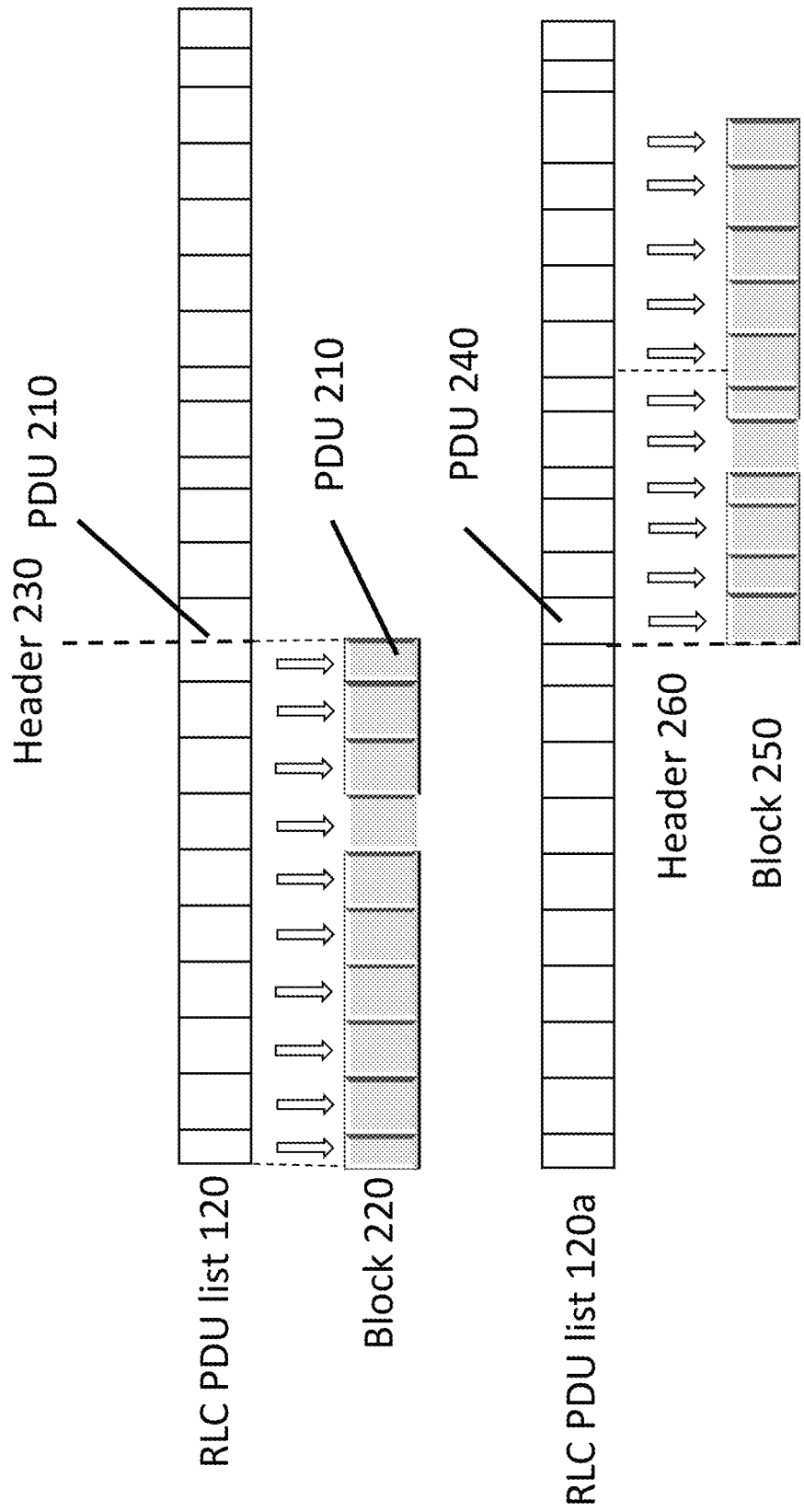
FIG. 3 illustrates segmentation of Protocol Data units within the RLC layer.

FIG. 3 illustrates an embodiment of the present invention and depicts an example when if during the scanning process no PDU is found to match the remaining in grant space after scanning the configured maximum number of PDUs in the list 120. In this embodiment, the RLC layer 100 segments the next available PDU (or the actual to actual to-be-sent PDU) 210 in the list 120 to fill the available grant in the transmission block 220. This avoids unnecessary padding of the block 220 before the block 220 is transmitted to the MAC layer 110.

In the above case, no PDUs from the list 120 are stored in the priority list 170. Instead, an RLC header 230 is appended at the end of block 220 before the block 220 is transmitted to the MAC layer 110. Subsequently, the remaining segment 240 takes priority over the rest of the PDUs in the list 120, and is initially appended to a subsequent block 250, before additional PDUs from the list 120 are appended to the block 250. Additionally, another RLC header 260 is inserted at the beginning of the block 250, before it is sent to the MAC layer 110 during a second transmission opportunity 190. The RLC headers 230, 260 allows a peer RLC layer (not shown) to track the segmentation of the PDUs during re-assembly.

In embodiments, the above process is repeated until all the PDUs stored in the list 120 are transmitted to the MAC layer 110. Thus, by the implementing the scanning procedure as disclosed in the present invention, segmentation of the actual to actual to-be-sent PDU 140, 200 is avoided in the first instance. This increases the amount of grant available in each of the blocks to be sent to the MAC layer, because no headers 230, 260 are necessary during re-assembly in the peer where segmentation of PDUs has not occurred. Thus, the number of cycles spent during a transmission opportunity is minimized, as no additional headers need to be created and the remaining segment (e.g. 240 in FIG. 3) does not need to be stored.

Furthermore, the blocks transmitted from the MAC layer 110 are segmented into individual PDUs within a peer RLC layer (not shown), and transmitted to a peer PDCP layer (also not shown). During construction of the blocks in the RLC layer 100, the original ordering of the PDUs in the list 120 can be lost during the scanning and storing of the PDUs in the priority list 170. Thus, in order to ensure that the peer PDCP layer receives the PDUs in the correct order, the peer PDCP layer re-ordering mechanism is utilized, as illustrated in an embodiment in FIG. 4.

In this example, a PDU 270 arrives before a PDU 280 in the peer PDCP layer, because PDU 280 was initially stored in the priority list 170, and was transmitted in a block that arrived subsequent to a block containing PDU 270. However, a PDCP re-ordering mechanism ensures that the original order of the PDCP SDU list 120 is maintained.

In this embodiment, by using the re-ordering mechanism of the peer PDCP layer, the PDUs are received in the correct order without the need to use headers within the blocks, in cases where segmentation of the PDUs has not occurred. Therefore, this avoids the need remove to duplicate bytes resulting from re-transmission of PDU even before it is fully segmented or in the case of bad radio conditions, and hence reduces the number of cycles spent during re-assembly.

Thus, the above method not only reduces number of the spent during transmission opportunity, but also number of cycles spent by receiving entity for re-assembly. This results in an increase of the overall system throughout by as much as 10%.

From reading the present disclosure, other variations and modifications will be apparent to the skilled person. Such variations and modifications may involve equivalent and other features which are already known in the art of wireless communication systems, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A system for transmitting Protocol data units (PDUs), said system comprising:
    a radio link control (RLC) layer for storing a RLC PDU list of RLC Protocol Data Units (PDUs) received from a ProtocolData Convergence Protocol (PDCP) layer, said control layer comprising:
        a transmission block for transmission to a Media Access Layer (MAC) layer in a transmission event, wherein the transmission block is populated with a subset of PDUs in the RLC PDU list;
        wherein when the transmission block is near a storage limit, the system scans the RLC PDU list one-by-one for a PDU that best fits a remaining grant of the transmission block, as determined based on sizes of the scanned PDUs, to complete population of the transmission block; and
        a priority list for storing already scanned PDUs of the RLC PDU list that were greater in size than the remaining grant.

2. A system according to claim 1, wherein the RLC layer further comprises:
    a further transmission block, said further transmission block populated with PDUs in the RLC PDU list, with priority given to the already scanned PDUs stored within the priority list; and
    wherein said further transmission block is transmitted to the MAC layer in a further transmission event.

3. A method for enhancing system performance in 5G modes, said method comprising:
    i) storing in a Radio Link Control (RLC) layer a RLC PDU list of RLC Protocol Data Units (PDUs);

ii) when a size of a next available PDU in the RLC PDU list is greater than a remaining grant of a first transmission block, scanning the RLC PDU list one-by-one to locate a PDU that best fits the remaining grant, as determined based on sizes of the scanned PDUs, wherein the best-fit PDU has a size that is less than or equal to the remaining grant; and
   a) appending the best-fit PDU to the first transmission block,
iii) appending remaining already scanned PDUs of the RLC PDU list to a priority list; and
iv) transmitting the first transmission block to a first Media Access Control (MAC) layer.

4. The method of claim 3, further comprising the steps of:
v) appending the already scanned PDUs in the priority list to a subsequent transmission block, wherein the subsequent transmission block is a next transmission block after the first transmission block is transmitted to the MAC layer; and
vi) repeating steps ii) to v) until all the PDUs in the list are transmitted to the MAC layer.

5. The method of claim 3, wherein the step of appending the best-fit PDU to the first transmission block is performed only if the best-fit PDU is found as a result of the scanning, and the step of scanning the RLC PDU list further comprises:
   b) if no PDU that best fits the remaining grant is found, segmenting the next available PDU in the RLC PDU list and appending a segment of the next available PDU to the first transmission block.

6. The method of claim 3, wherein step ii) is performed for a fixed number of PDUs in the RLC PDU list.

7. The method of claim 3, wherein the size of each PDU in the RLC PDU list is distinct.

8. The method of claim 3, wherein a size of the transmission block is set by the MAC layer.

9. A method for enhancing system performance in 5G modes, said method comprising:
   i) storing in a Radio Link Control (RLC) layer a RLC PDU list of Protocol data units (PDUs);
   ii) when a size of a next available PDU in the RLC PDU list is greater than a remaining grant of a first transmission block, scanning the RLC PDU list one-by-one for up to a fixed maximum number of PDUs to locate a PDU that best fits the remaining grant, as determined based on sizes of the scanned PDUs; and
   iii) if located, appending the PDU that best fits the remaining grant to the first transmission block, and if no best fit PDU is located as a result of scanning the fixed maximum number of PDUs, appending a segment of the next available PDU to the first transmission block; and
   iv) transmitting the first transmission block to a Media Access Control (MAC) layer.

10. The method of claim 9, further comprising appending the scanned PDUs to a priority list.

11. The method of claim 9, further comprising appending the scanned PDUs in the priority list to a subsequent transmission block, wherein the subsequent transmission block is an immediately subsequent transmission block after the first transmission block is transmitted to the MAC layer.

12. The method of claim 9, further comprising repeating steps ii) to iv) until all the PDUs in the RLC PDU list are transmitted to the MAC layer.

13. The method of claim 9, wherein the size of each PDU in the RLC PDU list is distinct.

14. The method of claim 9, wherein the size of the transmission block is set by MAC layer.

15. The system of claim 1, wherein the scanning for the RLC PDU list is performed one-by-one for up to a fixed maximum number of PDUs in the RLC PDU list.

\* \* \* \* \*